United States Patent [19]

Kuwabara et al.

[11] Patent Number: 5,069,550

[45] Date of Patent: Dec. 3, 1991

[54] OPTICAL MEASURING MACHINE WITH DETACHABLE OPERATING BOARD

[75] Inventors: Yoshiharu Kuwabara, Machida; Masamichi Suzuki, Yokohama, both of Japan

[73] Assignee: Mitutoyo Corporation, Tokyo, Japan

[21] Appl. No.: 587,102

[22] Filed: Sep. 24, 1990

[30] Foreign Application Priority Data

Sep. 29, 1989 [JP] Japan ............................ 1-114256[U]

[51] Int. Cl.[5] .............................................. G01B 11/02

[52] U.S. Cl. .................................... 356/383; 250/560; 356/386; 356/387

[58] Field of Search ............... 356/383, 384, 385, 386, 356/387; 250/560; 364/560, 561, 562, 563, 564

[56] References Cited

U.S. PATENT DOCUMENTS 4,978,223 12/1990 Kutchenriter et al. ............. 356/384

FOREIGN PATENT DOCUMENTS 2138562A 10/1984 United Kingdom ................ 356/387

OTHER PUBLICATIONS

Taylor, Conference: Proceeding of the 13th, 23rd International Wire and Cable Symposium, Atlantic City, N.J. (Dec. 3-5, 1974) pp. 326-329.

*Primary Examiner*—F. L. Evans

*Attorney, Agent, or Firm*—Oliff & Berridge

[57] ABSTRACT

An optical measuring machine is provided with an operating board which is provided separately from the main body of the optical measuring machine and which inputs and/or outputs measuring information and a retaining portion for removably retaining the operating board on a side surface of the main body. The operating board is ordinarily retained on the side surface of the main body, thereby enabling the reduction in the space for the installation of the measuring machine and the improvement of portability. When the operating board mounted on the side surface of the main body is difficult to use due to the positional relationship with an object of measurement, the necessity to set complicated measuring conditions or the like, it is possible to use the operating board in the state of being removed from the main body.

8 Claims, 4 Drawing Sheets

12a 12 10 36a 36b 24 14 22 20 18 16

26a(26b)
28
32a(32b)
18
34a(34b)
26c(26d)
36a(36b)
12a 26b
18
26d
30b
32b
34b
28
30a
32a
34a
26a
26c

OPTICAL MEASURING MACHINE WITH DETACHABLE OPERATING BOARD

BACKGROUND OF THE INVENTION

1. Field of the Invention

The present invention relates to an optical measuring machine and, more particularly, to the improvement of the operating board thereof.

2. Description of the Prior Art

An optical measuring machine for measuring the length or the shape of an object of measurement by utilizing a laser beam or the like which is shaded by the object has recently been generally used in various fields.

Such an optical measuring machine requires an operating board so as to input a measuring order and various information data on an object of messurement.

Conventionally, a small computer for inputting various information data is provided as a separate body and a command is supplied to an optical measuring machine through the small computer. With the recent tendency of reduction in size and weight of a CPU, a memory, etc. and enlargement of the environment range in which a measuring machine is usable, a measuring machine integrally provided with an operating board has also been developed.

A conventional optical measuring machine integrally provided with an operating board, however, has a problem in the operability.

More specifically, although an optical measuring machine integrally provided with an operating board is compact as a whole, thereby contributing to the reduction in size and weight of the measuring machine as a whole, remote control is impossible and the operating board is difficult to operate due to the positional relationship between an object of measurement and the operating board.

On the other hand, a measuring machine having an operating board separately therefrom requires a space exclusively for mounting the operating board, thereby requiring a wide space for the installation of the measuring machine and if it is a portable measuring machine, an inconvenience is caused at the time of moving the measuring machine.

SUMMARY OF THE INVENTION

Accordingly, it is an object of the present invention to eliminate the above-described problem in the prior art and to provide an optical measuring machine which can contribute to the reduction in size and weight of a measuring machine and which is improved in operability.

To achieve this aim, an optical measuring machine according to the present invention is provided with an operating board which is provided separately from the main body and which inputs and/or outputs measuring information.

An optical machine according to the present invention is also provided with a retaining portion for removably retaining the operating board on a side surface of the main body of the measuring machine with the back surface of the former faced to the side surface of the latter.

Since an optical machine according to the present invention has the retaining portion, the operating board is ordinarily retained on the side surface of the main body of the measuring machine, thereby enabling the reduction in the space for the installation of the measuring machine and the improvement of portability.

However, for example, when the operating board is difficult to use in the state in which it is mounted on the main body of the measuring machine due to the positional relationship with an object of measurement or when the operating board mounted on the side surface of the measuring machine is difficulty to operate because it is necessary to set complicated measuring conditions, it is possible to operate the operating board in the state in which it is removed from the main body of the optical measuring machine.

In the present invention, the relating portion is preferably composed of a relating metal which is disposed at an upper portion of the back surface of the operating board and which is cranked and a relating screw which is disposed on the side surface of the main body of the measuring machine in such a manner as to be engaged with the retaining metal.

An optical measuring machine of the present invention is preferably provided with legs made of an elastic material which are disposed at the four corners of the back surface of the operating board, and a magnet which is disposed closer to the center of the back surface of the operating board than the legs. The heights of the legs are preferably larger than the height of the magnet.

It is preferable that the main body of the measuring machine is portable and the operating board is retainable on the main body of the measuring machine at various angles.

The above and other objects, features and advantages of the present invention will become clear from the following description of the preferred embodiments thereof, taken in conjunction with the accompanying drawings.

DESCRIPTION OF THE PREFERRED EMBODIMENTS

The preferred embodiments of the present invention will be explained with reference to the accompanying drawings.

Figure 1:
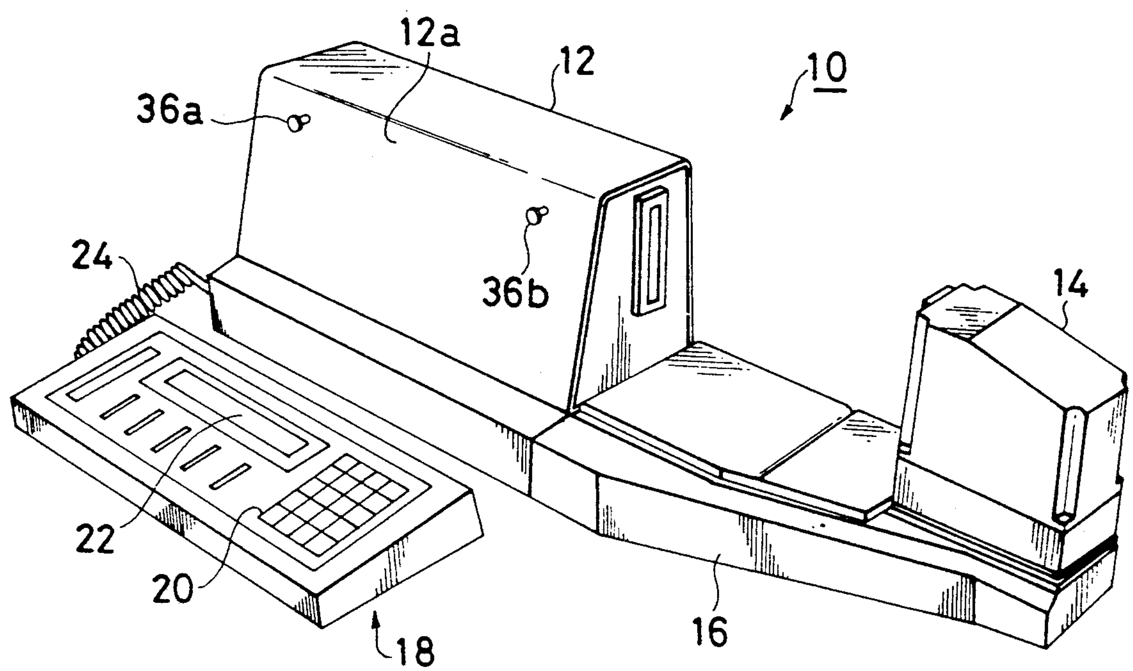
FIG. 1 is a perspective view of the external appearance of the first embodiment of an optical measuring machine according to the present invention.

FIG. 1 is a perspective view of the external appearance of a first embodiment of an optical measuring machine according to the present invention.

An optical measuring machine 10 shown in FIG. 1 is composed of a light emitting portion 12 and a light receiving portion 14 which are disposed on a base 16 in such a manner as to be opposed to each other.

The light emitting portion 12 includes a beam generator, a converting means for converting a laser beam generated by the beam generator into a scanning beam, a collimator lens for converting the scanning beam into a parallel beam, etc. which are not shown in FIG. 1.

The light receiving portion 14 includes a measuring light receiving devices for detecting the brightness of the parallel scanning beam which has passed through an object of measurement.

The dimension of the object of measurement is obtained from the length of the dark portion or the bright portion caused when the parallel scanning beam is shaded by the object of measurement.

The calculation of the length is carried out on an operating board 18 in the present invention. The operating board 18 is provided separately from the main body of the measuring machine and includes a touch key panel 20 which is capable of inputting various measuring conditions, a liquid crystal display 22 which is capable of displaying a measured value, a CPU for carrying out calculation of the measured value and a memory, etc. which are provided within the operating board 18.

The operating board 18 is connected to the main body of the measuring machine by cord 24 which transmits data and supplies a driving current.

The characteristic feature of the present invention lies in that the operating board is so designed as to be removably retained on the main body of the measuring machine. In this embodiment, the operating board 18 is retained on a side surface 12*a* (front surface) of the main body of the measuring machine with the back surface of the former faced to the side surface of the latter.

Figure 2:
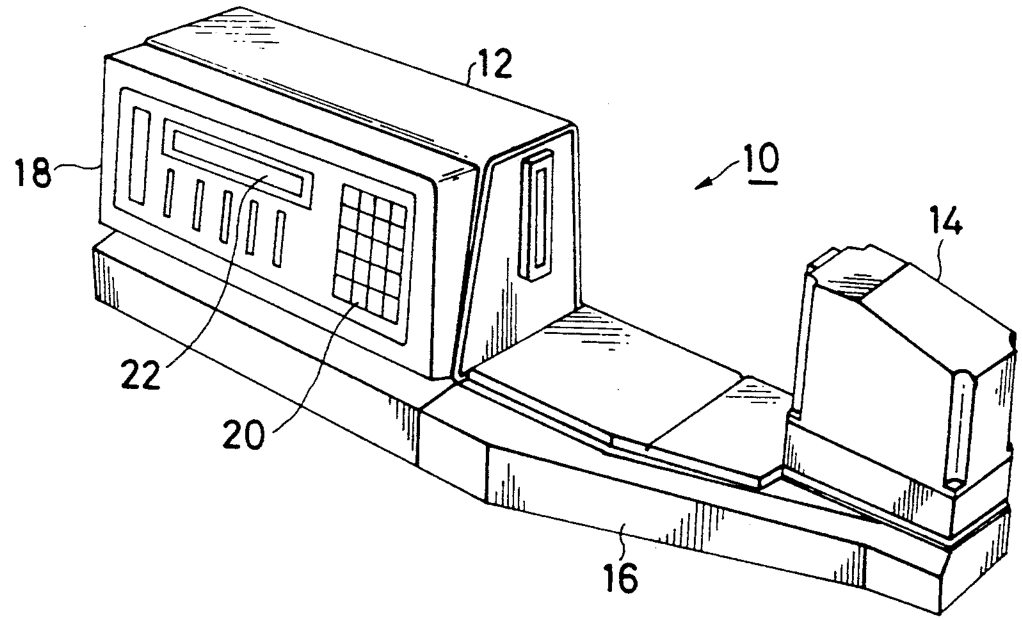
FIG. 2 is an explanatory view of the operating board of the first embodiment in the state of being mounted on the main body thereof.

FIG. 2 shows the state in which the operating board 18 is mounted on the main body of the measuring machine. It will be understood that the space for the installation of the measuring machine is reduced in comparison with the state shown in FIG. 1, thereby enabling the reduction in size of the measuring machine as a whole.

Figures 3A, 3B:
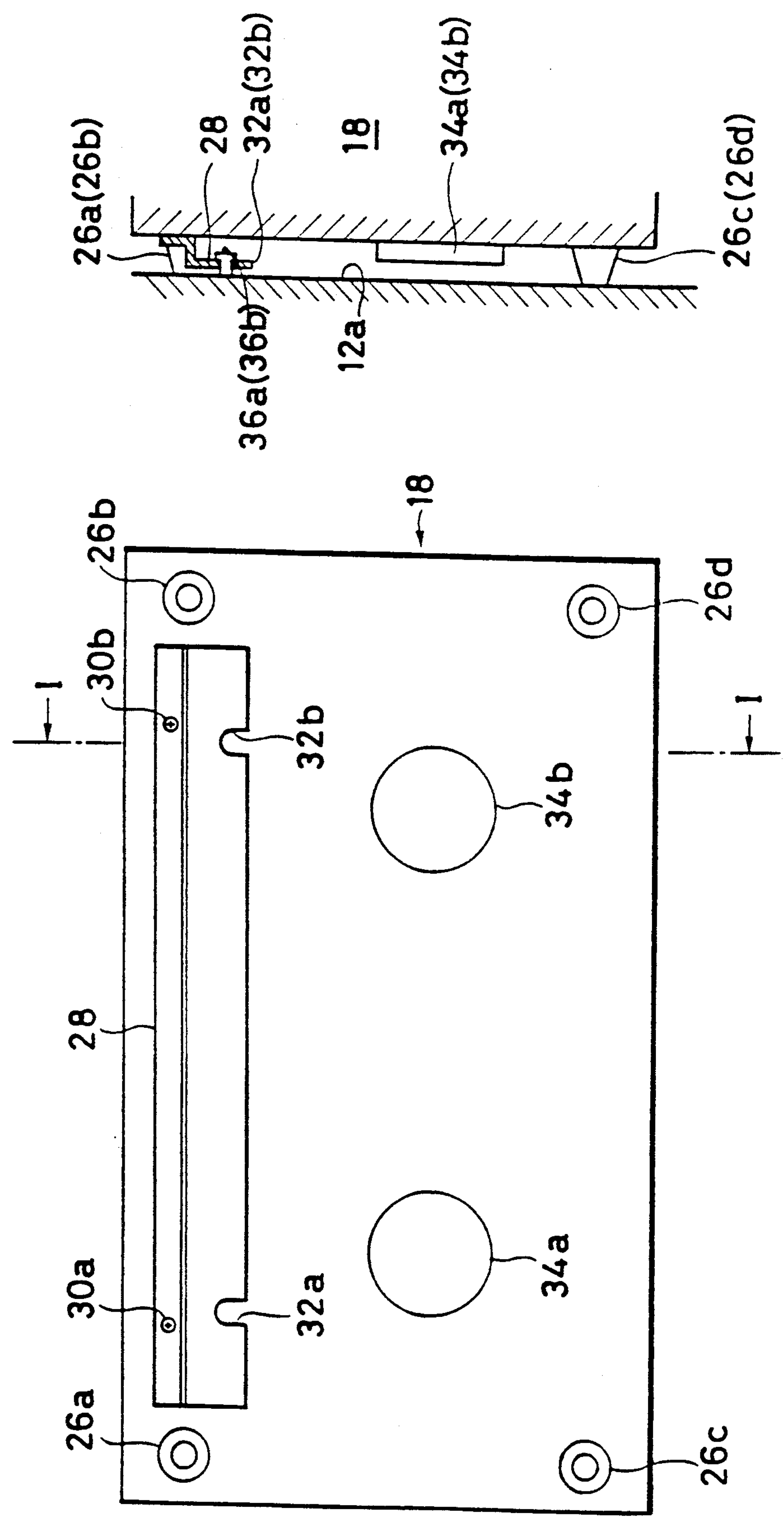
FIGS. 3(A) and 3(B) are explanatory views of the mechanism for retaining the operating board on the main body of the measuring machine.

An optical measuring machine of this embodiment is provided with a retaining portion shown in FIGS. 3(A) and 3(B) so as to enable the operating board to be retained on the main body of the measuring machine.

FIG. 3(A) shows the back surface of the operating board 18 with legs 26*a*, 26*b*, 26*c*, 26*d* made of an elastic material such as rubber provided at the four corners thereof.

A retaining metal 28 is disposed at the portion on the back surface of the operating board 18 which is an upper portion when it is mounted on the main body of the measuring machine.

The retaining metal 28 is fixed by screws 30*a* and 30*b* and cranked in such a manner as to protrude toward the front in FIG. 3(A). Notched portion 32*a* and 32*b* are provided on both side portion of the retaining metal 28.

Circular magnets 34*a* and 34*b* are provided on both sides of substantially the center of the back surface of the operating board 18.

FIG. 3(B) is a vertical sectional view of the operating board 18 shown in FIG. 3(A) in the state of being mounted on the main body of the measuring machine, taken along the line I—I.

As is clear from FIG. 3(B), the notched portion 32*a*(32*b*) of the retaining metal 28 provided on the back surface of the operating board 18 is engaged with a retaining screw 36*a*(36*b*) which is provided on the upper portion of the side surface 12*a* of the main body of the measuring machine. Consequently, the operating board 18 is retained in the state of being hung on the side surface 12*a* of the main body of the measuring machine.

Since the magnets 34*a*, 34*b* are attracted to the main body of the measuring machine by the magnetic force, the operating board 18 is stably retained on the side surface 12*a* of the main body of the measuring machine.

The heights of the retaining metal 28 and the magnets 34*a*, 34*b* are made smaller than those of the legs 26*a*, 26*b*, 26*c*, 26*d* so as to prevent the side surface 12*a* of the main body of the measuring machine from being scratched by the retaining metal 28 or the magnets 34*a*, 34*b*.

As described above, according to a first embodiment of an optical measuring machine, it is possible to use the operating board 18 constantly in the optimum state by mounting or removing the operating board 18 on or from the side surface 12*a* of the main body of the measuring machine in accordance with the manner of use. Ordinarily, the operating board is mounted on the side surface 12*a* of the main body so as to reduce in the space for installation of the measuring machine.

Figure 4:
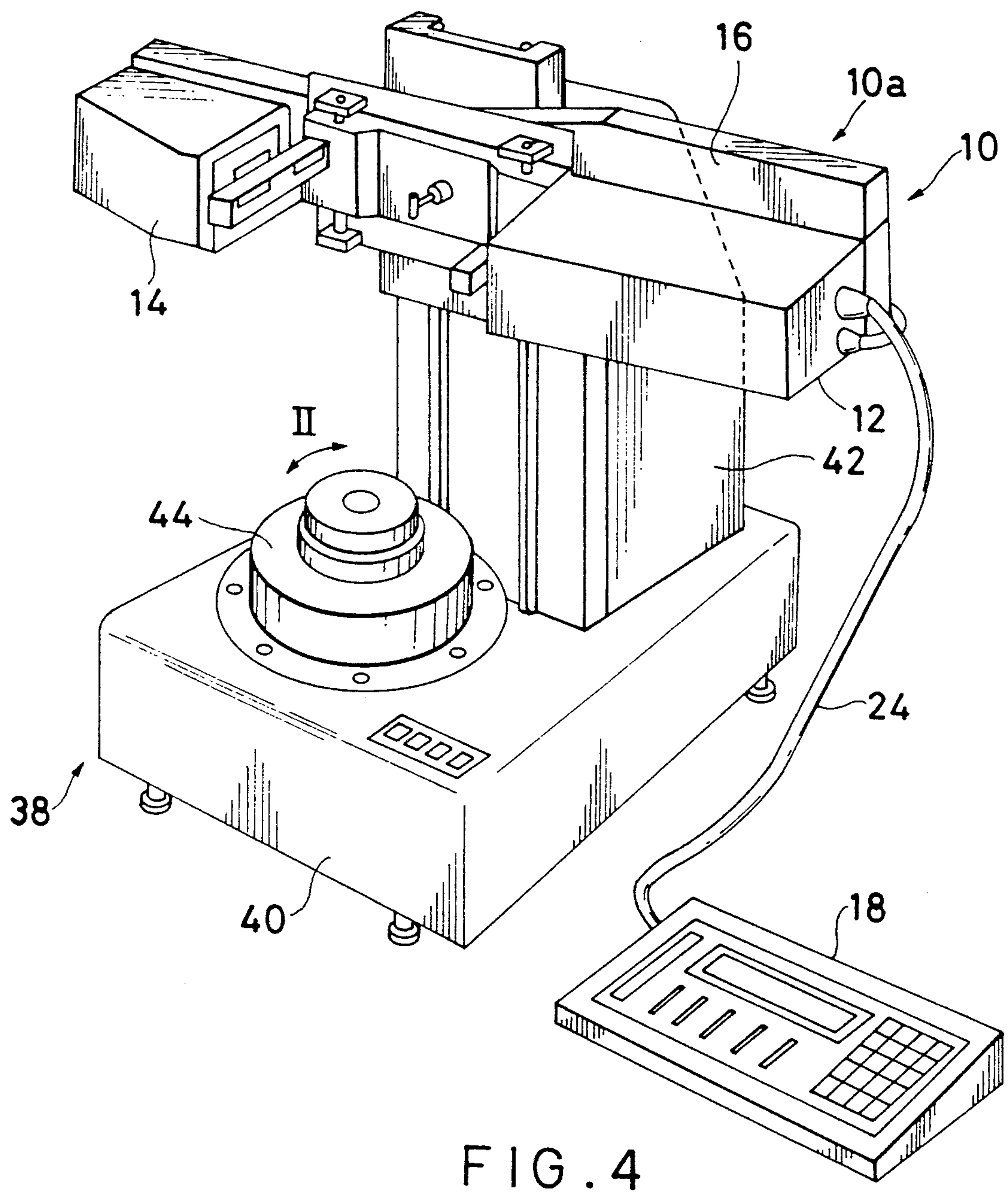
FIG. 4 is an explanatory view of an example of the manner of use of the first embodiment.

FIG. 4 shows an example of the manner of use of the first embodiment shown in FIG. 1.

In FIG. 4, the main body 10*a* of the measuring machine is in the state of being mounted on a roundness measuring machine 38.

The roundness measuring machine 38 is provided with a base 40, and a support 42 and a rotary table 44 which are provided on the base 40.

The main body 10*a* of the optical measuring machine is vertically movably held by the support 42.

It is therefore possible to measure the roundness of a cylindrical object of measurement, for example, placed on the rotary table 44 by rotating the rotary table 44 in the direction indicated by the arrow II while measuring the diameter thereof by the optical measuring machine 10.

It is also possible to continuously measure the diameter of the cylindrical body in this state by vertically moving the optical measuring machine 10 relative to the support 42.

In a measuring machine of this embodiment, since the operating board 18 is provided separately from the main body, operation of the operating board 18 and the reading of the measured value are very easy even in the above-described manner of use.

Figure 5:
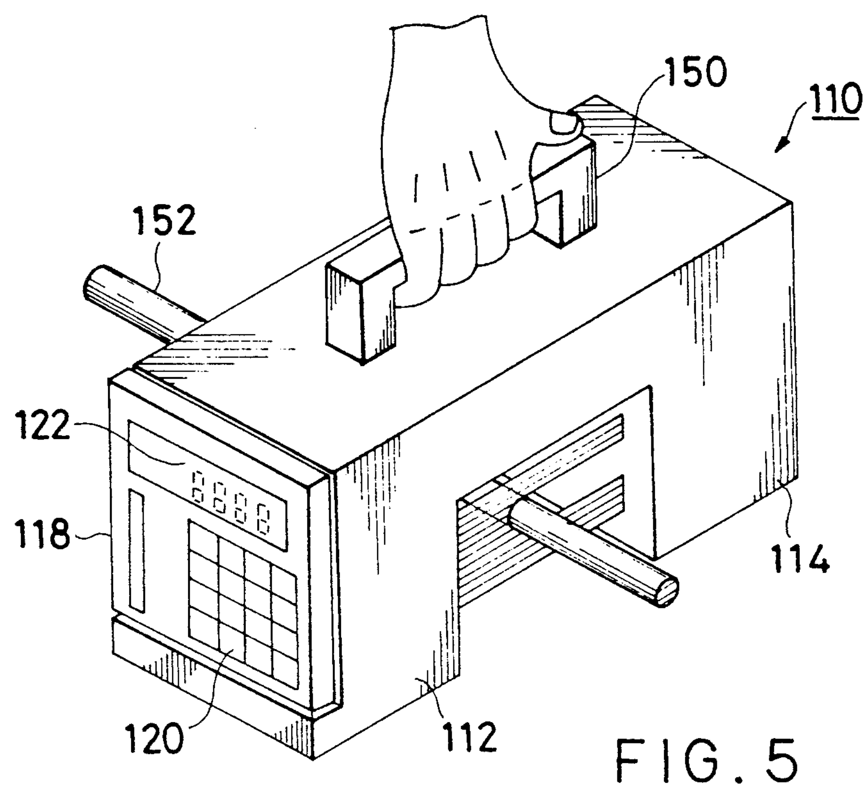
FIGS. 5 and 6 are explanatory views of the second embodiment of an optical measuring machine according to the present invention.
Figure 6:
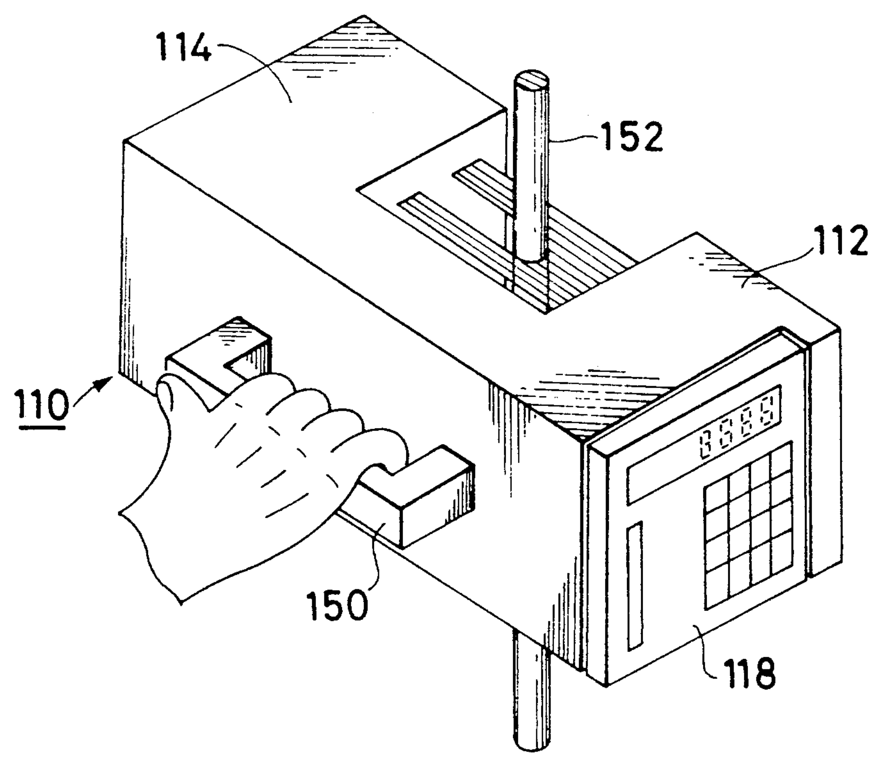

FIGS. 5 and 6 show a second embodiment of an optical measuring machine according to the present invention. The same numerals prefixed by the numeral 1 are provided for the elements which are the same for those in FIG. 1, and explanation thereof will be omitted.

In this embodiment, an optical measuring machine 110 is so designed as to be portable. A handle 150 is provided on the upper surface of the measuring machine 110.

An object 152 of measurement which cannot be moved is inserted into a space between a light emitting portion 112 and a light receiving portion 114 for carrying out measurement in the same way as in the first embodiment.

An operating board 118 mounted on the side surface of the main body of the measuring machine is usable in the state shown in FIG. 5. However, when the optical measuring machine 110 must be used in the state in which the surface holding the object 152 of measurement is faced upward, the operating board 118 is difficult to use and the reading of the measured value is troublesome in the mounting state shown in FIG. 5.

Therefore, the operating board 118 is removed from the main body before use, or the relative direction of the operating board 118 and the main body 110*a* of the measuring machine is changed, as shown in FIG. 6, thereby facilitating the operation.

If the retaining screws 36*a* and 36*b* are provided on a part of an apparatus which is disposed in proximity thereto and the operating board 118 is engaged with the retaining screws 36*a* and 36*b* in the same way as in the first embodiment, the operation of the operating board 118 is further facilitated.

Although the operating board and the main body of the measuring machine are connected with each other by a cord in these embodiments, a cordless optical machine in which data is transmitted and received through an electric wave is also preferable.

In this case, the operating board also requires a power source, but it is possible to use a cell or battery provided within the operating board as the power source.

In the case of using a battery, it is preferable that the battery within the operating board is fed and charged from the main body, for example, through the legs shown in FIG. 3 while the operating board is mounted on the main body of the measuring machine.

As described above, according to an optical measuring machine of the present invention, since the operating board is separately provided from the main body of the measuring machine and removably mounted on the main body, it is possible to secure a good operability without enlarging the space for installation.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An optical measuring machine having a main body comprising a light emitting portion and a light receiving portion, the machine constructed so as to measure the length of an object of measurement by the amount of light which is emitted from said light emitting portion and is shaded by said object, said optical measuring machine further comprising:

an operating board which is provided separately from the main body of said optical measuring machine and which inputs measuring conditions and/or outputs measured results; and a retaining portion for removably retaining said operating board on a side surface of said main body of said measuring machine with a back surface of said operating board faced to the side surface of said main body.

2. An optical measuring machine according to claim 1, wherein said retaining portion includes:

a retaining metal which is disposed at an upper portion of the back surface of said operating board and which is cranked; and a retaining screw which is disposed on the side surface of said main body of said measuring machine in such a manner as to be engaged with said retaining metal.

3. An optical measuring machine according to claim 1, wherein said operating board is provided with a magnet on the back surface thereof.

4. An optical measuring machine according to claim 1, wherein:

the back surface of said operating board has four corners and a center, and is provided with legs made of an elastic material which are disposed at the four corners, and a magnet which is disposed closer to the center of the back surface of said operating board than said legs;

the heights of said legs being larger than the height of said magnet.

5. An optical measuring machine according to claim 1, wherein the back surface of said operating board has four corners and a center, and said retaining portion includes:

a retaining metal which is disposed at an upper portion of the back surface of said operating board and which is cranked;

a retaining screw which is disposed on the side surface of said main body of said measuring machine in such a manner as to be engaged with said retaining metal;

legs made of an elastic material which are disposed at the four corners of the back surface of said operating board; and a magnet which is disposed closer to the center of the back surface of said operating board than said legs;

the heights of said legs being larger than the height of said magnet.

6. An optical measuring machine according to claim 1, wherein said main body of said measuring machine and said operating board are connected with each other by a cord for transmitting data and supplying a driving current.

7. An optical measuring machine according to claim 4, wherein data is transmitted and received between said main body of said measuring machine and said operating board through an electric wave, and a driving current is supplied to and stored in said operating board through said legs while said operating board is mounted on said main body.

8. An optical measuring machine according to claim 1, wherein said main body of said measuring machine is portable, and said operating board is retainable on said main body at various angles.

* * * * *